(12) United States Patent
Xu et al.

(10) Patent No.: US 9,531,180 B2
(45) Date of Patent: Dec. 27, 2016

(54) WATERPROOF CABLE ASSEMBLY/CONNECTOR

(71) Applicant: Changzhou Amphenol Fuyang Communication Equip. Co., Ltd., Wujin, Changzhou, Jiangsu (CN)

(72) Inventors: Yiming Xu, Changzhou (CN); Tingxing Sheng, Changzhou (CN)

(73) Assignee: Changzhou Amphenol Fuyang Communication Equip. Co., Ltd., Changzhou (CN)

( * ) Notice: Subject to any disclaimer, the term of this patent is extended or adjusted under 35 U.S.C. 154(b) by 185 days.

(21) Appl. No.: 14/167,400

(22) Filed: Jan. 29, 2014

(65) Prior Publication Data

US 2015/0162736 A1 Jun. 11, 2015

(30) Foreign Application Priority Data

Dec. 11, 2013 (CN) .................. 2013 2 0809661 U

(51) Int. Cl.
*H02G 15/013* (2006.01)
*H01R 13/52* (2006.01)
*H02G 15/04* (2006.01)

(52) U.S. Cl.
CPC ........ *H02G 15/013* (2013.01); *H01R 13/5213* (2013.01); *H02G 15/046* (2013.01)

(58) Field of Classification Search
CPC ..... H01R 13/52; H01R 13/523; H01R 33/965; H01R 43/005; H01B 7/282; H02G 3/088
See application file for complete search history.

(56) References Cited

U.S. PATENT DOCUMENTS

| | | | | |
|---|---|---|---|---|
| 2,132,258 | A * | 10/1938 | Elmer ...................... | H01Q 1/16 138/158 |
| 2,758,291 | A * | 8/1956 | Richards ............ | H01R 13/5205 439/281 |
| 2,935,720 | A * | 5/1960 | Lorimer ................. | H01R 31/00 174/93 |
| 3,567,843 | A * | 3/1971 | Collins ................ | H02G 3/0616 174/51 |
| 3,850,495 | A | 11/1974 | Glover | |
| 4,106,833 | A * | 8/1978 | Wilson .................. | H01M 2/202 324/426 |
| 4,526,430 | A * | 7/1985 | Williams ............. | H01R 13/523 439/152 |
| 4,549,755 | A * | 10/1985 | Kot ...................... | H02G 3/0658 174/51 |
| 4,557,546 | A | 12/1985 | Dreyer | |
| 6,390,848 | B1 * | 5/2002 | Murakami ......... | H01R 13/5205 439/148 |
| 6,398,581 | B1 * | 6/2002 | Baier .................. | H01R 12/616 439/404 |

(Continued)

*Primary Examiner* — Jeremy C Norris
*Assistant Examiner* — Muhammed Azam
(74) *Attorney, Agent, or Firm* — Blank Rome LLP; Tara L. Marcus

(57) ABSTRACT

A waterproof assembly that includes a neck that has a main body and an end that has an engagement member. A protective cover of the assembly includes a hollow body with opposite open ends and forms a receiving cavity. Each open end has at least one waterproof gasket. One of the open ends extends around and is sealably coupled to the main body of the neck.

22 Claims, 2 Drawing Sheets

(56) References Cited

U.S. PATENT DOCUMENTS

| | | | |
|---|---|---|---|
| 6,558,194 B2 * | 5/2003 | Montena | H01R 9/0521 439/578 |
| 6,676,446 B2 | 1/2004 | Montena | |
| 6,808,415 B1 * | 10/2004 | Montena | H01R 9/0518 439/584 |
| 6,848,940 B2 | 2/2005 | Montena | |
| 7,070,447 B1 | 7/2006 | Montena | |
| 7,156,696 B1 | 1/2007 | Montena | |
| 7,189,115 B1 | 3/2007 | Montena | |
| 7,311,554 B1 | 12/2007 | Jackson et al. | |
| 7,329,149 B2 | 2/2008 | Montena | |
| 7,357,672 B2 | 4/2008 | Montena | |
| 7,374,455 B2 | 5/2008 | Purdy et al. | |
| 7,431,614 B2 * | 10/2008 | Eriksen | H01R 13/5825 439/578 |
| 7,458,851 B2 | 12/2008 | Montena | |
| 7,908,741 B2 | 3/2011 | Chawgo | |
| 7,967,634 B1 * | 6/2011 | Hsia | H01R 9/0524 439/271 |
| 7,972,176 B2 | 7/2011 | Burris et al. | |
| 7,993,159 B2 | 8/2011 | Chawgo | |
| 8,007,314 B2 | 8/2011 | Chawgo et al. | |
| 8,123,557 B2 | 2/2012 | Montena et al. | |
| 8,177,583 B2 | 5/2012 | Chawgo et al. | |
| 8,366,482 B2 | 2/2013 | Burris et al. | |
| 2001/0036762 A1 * | 11/2001 | Payson | H01R 13/622 439/320 |
| 2002/0022392 A1 * | 2/2002 | Below | H01R 24/64 439/271 |
| 2004/0149471 A1 * | 8/2004 | Hall | E21B 17/003 174/21 R |
| 2004/0219831 A1 * | 11/2004 | Hall | E21B 17/028 439/578 |
| 2005/0026496 A1 * | 2/2005 | Islam | H01R 9/0521 439/578 |
| 2007/0054534 A1 * | 3/2007 | Kauffman | H01R 13/6277 439/345 |
| 2007/0240896 A1 * | 10/2007 | Ott, Jr. | H02G 3/0481 174/93 |
| 2008/0000672 A1 * | 1/2008 | Yamamoto | H01R 13/5208 174/23 R |
| 2009/0114429 A1 * | 5/2009 | Sri-Jayantha | H01L 23/49833 174/255 |
| 2010/0248533 A1 * | 9/2010 | Montena | H01R 13/5213 439/521 |
| 2011/0011484 A1 * | 1/2011 | Evoniuk | H02G 15/1833 138/177 |
| 2011/0129187 A1 * | 6/2011 | Toth | G02B 6/3816 385/70 |
| 2011/0181002 A1 * | 7/2011 | Fujita | H02G 15/013 277/616 |
| 2011/0287667 A1 * | 11/2011 | Ichio | H01R 13/4367 439/660 |
| 2011/0312210 A1 | 12/2011 | Chawgo et al. | |
| 2012/0064782 A1 * | 3/2012 | Kitajima | H01R 13/521 439/751 |
| 2012/0149227 A1 * | 6/2012 | Yoshida | H01R 13/5202 439/277 |
| 2012/0190234 A1 * | 7/2012 | Montena | H01R 13/5213 439/521 |
| 2013/0126234 A1 * | 5/2013 | Ono | H02G 15/08 174/75 R |
| 2013/0292173 A1 * | 11/2013 | Inoue | H01R 4/185 174/74 R |

* cited by examiner

WATERPROOF CABLE ASSEMBLY/CONNECTOR

FIELD OF THE INVENTION

The present invention relates to a waterproof assembly that protects and seals the junction of a cable assembly and mated connector.

BACKGROUND OF THE INVENTION

In mobile communication base stations or indoor coverage systems, for example, connectors are necessary to send high frequency signals and power. In an antenna feed system, in particular, which is used in a mobile communication base station, the conventional way of protecting the associated connector from being corroded is to wrap the connector with plaster or rubber. However, such wrapping often does not effectively protect the connector because of water seepage resulting in damage to the equipment. Therefore, there is a need for a device that seals the junction of a connector and its mated cable assembly to prevent water damage.

SUMMARY OF THE INVENTION

Accordingly, the present invention provides a waterproof assembly that includes a neck that has a main body and an end that has an engagement member. A protective cover of the assembly includes a hollow body with opposite open ends and forms a receiving cavity. Each open end has at least one waterproof gasket. One of the open ends extends around and is sealably coupled to the main body of the neck.

The present invention may also provide a waterproof assembly that includes a neck that has a main body and an end that has an engagement member. The engagement member is configured to engage a cable assembly. A protective cover of the assembly includes a hollow body with opposite open ends and forms a receiving cavity for receiving the cable assembly. Each open end has at least one waterproof gasket. One of the open ends extends around and is sealably coupled to the main body of the neck.

The present invention may further provide a waterproof assembly that includes a cable assembly that has a coupling nut terminated to a cable and a connector that has a neck. The neck has a main body and an end. The end has an engagement member that engages the coupling nut of the cable assembly. A protective cover that includes a hollow body with opposite open ends, forms a receiving cavity that receives the cable assembly. Each open end has at least one waterproof gasket. One of the open ends of the protective cover extends around and is sealably coupled to the main body of the neck and the other of the open ends of the protective cover extends around and is sealably coupled to the cable.

With those and other objects, advantages, and features of the invention that may become hereinafter apparent, the nature of the invention may be more clearly understood by reference to the following detailed description of the invention, the appended claims, and the several drawings attached herein.

DETAILED DESCRIPTION OF THE EXEMPLARY EMBODIMENTS

Figure 1:
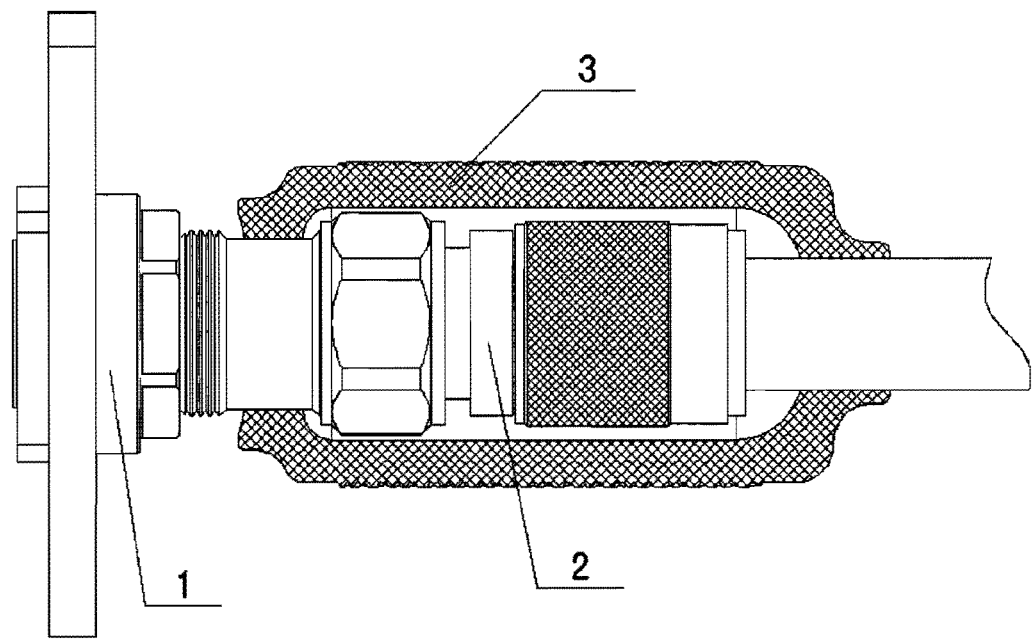
FIG. 1 is a cross-sectional view of the waterproof assembly according to an exemplary embodiment of the present invention.
Figure 2:
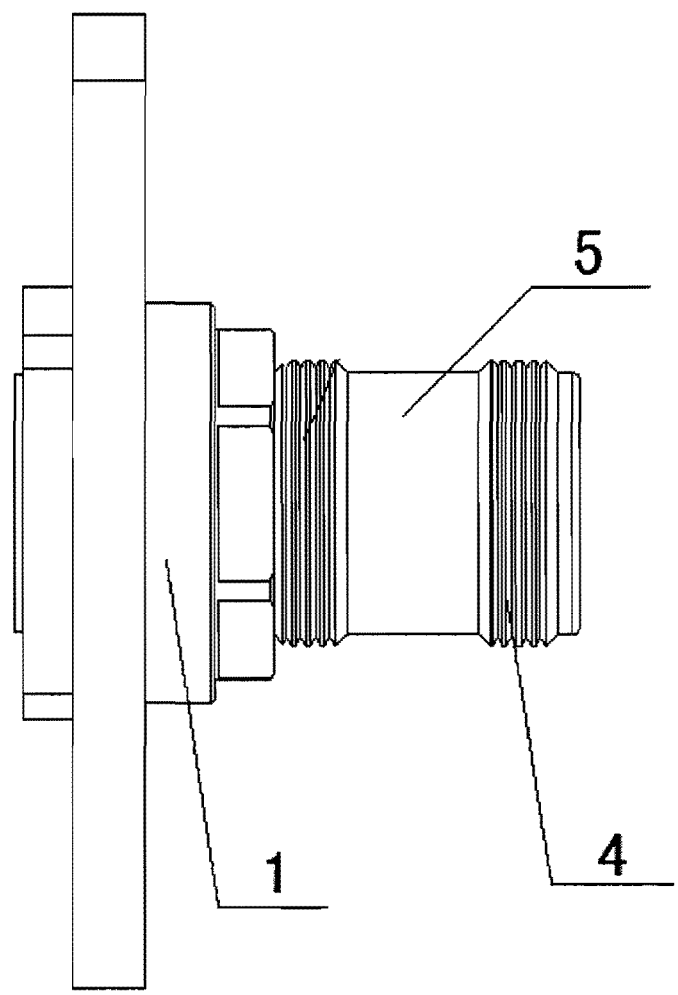
FIG. 2 is a side elevational view of a connector of the waterproof assembly illustrated in FIG. 1.

The following is detailed description of an exemplary embodiment of the present invention in combination with FIGS. 1-4. A waterproof assembly of the present invention provides waterproof protection to the junction of a connector 1 and a cable assembly 2. As seen in FIGS. 1 and 2, the connector 1 includes a neck 5 configured to engage the cable assembly 2. In particular, at an end of the neck 5 is an engagement member 4 configured to engage the cable assembly 2. The engagement member 4 is preferably threads. The threads of the engagement member 4 forms an outer diameter that is preferably larger than the outer diameter of the main body of the neck 5.

Figure 3:
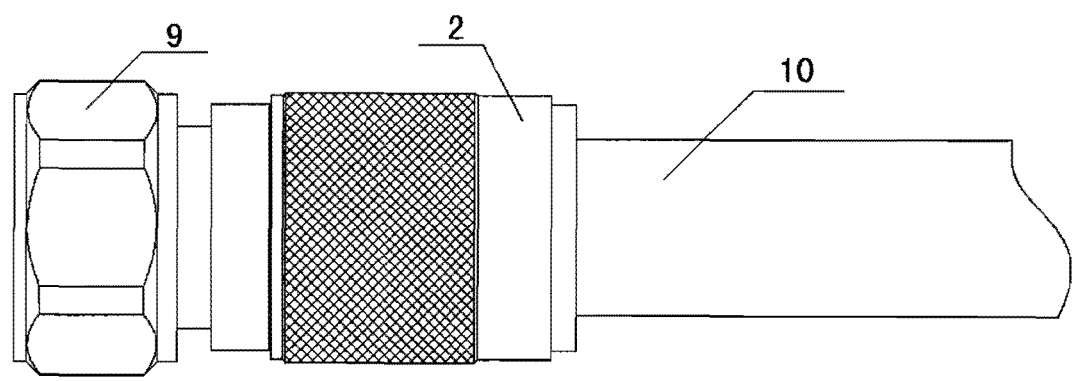
FIG. 3 is a side elevational view of a cable assembly used with the waterproof assembly illustrated in FIG. 1.

As seen in FIG. 3, the cable assembly 2 includes a connector that is terminated to end of a cable 10 in a known manner. The connector includes a coupling nut 9 which rotates with respect to the cable 10. The cable 10 may be of a spiral or corrugated structure. The coupling nut 9 preferably has internal threads that engage the threads 4 at the end of the neck 5, as best seen in FIG. 1.

The waterproof assembly of the present invention further includes a protective cover 3 that covers the end of the cable assembly 2 including the coupling nut 9 and also covers a portion of the neck 5, as seen in FIG. 1. The protective cover 3 is preferably a hollow structure defining a receiving cavity 7. The protective cover 3 has opposite open ends 6 and 12. The open ends 6 and 12 preferably have inner diameters that are smaller than the inner diameter of the receiving cavity 7. The protective cover 3 is preferably formed of a rubber material.

Figure 4:
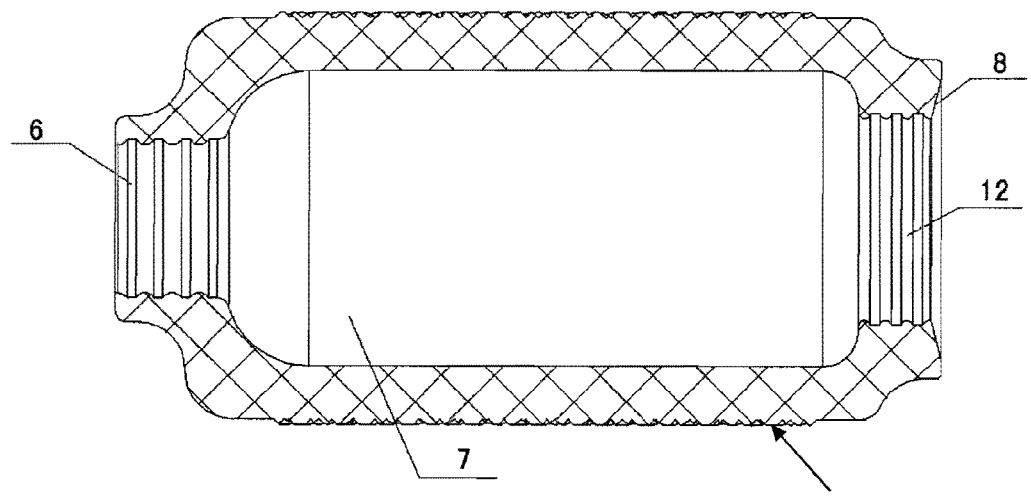
FIG. 4 is a cross-sectional view of a cover of the waterproof assembly illustrated in FIG. 1.

Both open ends 6 and 12 of the protective cover 3 preferably include one or more waterproof gaskets, as seen in FIG. 4. The gaskets may be formed as inner grooves formed into the inner surface of the open ends 6 and 12, respectively, or may be separate waterproof gaskets disposed in inner groove in each end 6 and 12. The inner diameter of the open end 6 of the protective cover 3 is sized such that it can be tightly sleeved onto the main body of the neck 5 so that the open end extends around and sealably couples to the neck 5. Similarly, the inner diameter to the open end 12 is sized such that it can be tightly sleeved over the cable 10, whether a spiral or corrugated configuration.

By sealably coupling the open ends 6 and 12 of the protective cover 3 to the neck 5 and the cable 10 via the waterproof gaskets, the junction of the neck 5 and the cable assembly 2 is protected and sealed. The waterproof protective cover 3 will also not fall off even in its natural state, thus guaranteeing a waterproof junction. After the protecting cover 3 is sleeved, it inclines inwards on the neck 5, so as to further guarantee the waterproof function. The end of the open end 12 may be provided with a chamfer 8 to facilitate pushing of the protective cover over onto the connector 1 and cable assembly 2. The outer surface of the protecting cover 3 may be provided with an anti-slide layer 13 to increase the friction, thereby facilitating assembly and disassembly of the cover 3.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A waterproof assembly, comprising:
   a neck having a main body and an end, said end having an engagement member; and
   a protective cover including a hollow body with opposite open ends, said hollow body forming a receiving cavity, each open end having at least one waterproof gasket, said at least one waterproof gasket being an inner groove formed in the receiving cavity, one of said open ends extending around and being sealably coupled to said main body of said neck.

2. A waterproof assembly according to claim 1, wherein said engagement member is threads.

3. A waterproof assembly according to claim 2, wherein an outer diameter of said engagement member is larger than said main body of said neck.

4. A waterproof assembly according to claim 1, further comprising
   a plurality of waterproof gaskets disposed in each open end of said protective cover.

5. A waterproof assembly according to claim 1, wherein at least one of said open ends of said protective cover having a chamfer.

6. A waterproof assembly according to claim 1, wherein said protective cover is formed of rubber.

7. A waterproof assembly according to claim 6, wherein an outer surface of said protective cover has an anti-slide layer.

8. A waterproof assembly, comprising:
   a neck having a main body and an end, said end having an engagement member, said engagement member being configured to engage a cable assembly; and
   a protective cover including a hollow body with opposite open ends, said hollow body forming a receiving cavity for receiving the cable assembly, each open end having at least one waterproof gasket, one of said open ends extending around and being sealably coupled to said main body of said neck.

9. A waterproof assembly according to claim 8, wherein said engagement member is threads.

10. A waterproof assembly according to claim 9, wherein an outer diameter of said engagement member is larger than said main body of said neck.

11. A waterproof assembly according to claim 9, further comprising
    a plurality of waterproof gaskets disposed in each open end of said protective cover.

12. A waterproof assembly according to claim 11, wherein at least one of said open ends of said protective cover having a chamfer.

13. A waterproof assembly according to claim 12, wherein said protective cover is formed of rubber.

14. A waterproof assembly according to claim 13, wherein an outer surface of said protective cover has an anti-slide layer.

15. A waterproof assembly, comprising:
    a cable assembly including a coupling nut terminated to a cable;
    a connector including a neck having a main body and an end, said end having an engagement member engaging said coupling nut of said cable assembly; and
    a protective cover including a hollow body with opposite open ends, said hollow body forming a receiving cavity that receives said cable assembly, each open end having at least one waterproof gasket, one of said open ends of said protective cover extending around and being sealably coupled to said main body of said neck and the other of said open ends of said protective cover extending around and being sealably coupled to said cable.

16. A waterproof assembly according to claim 15, wherein said engagement member is threads and
    an outer diameter of said engagement member is larger than said main body of said neck.

17. A waterproof assembly according to claim 16, further comprising
    a plurality of waterproof gaskets disposed in each of said open ends of said protective cover.

18. A waterproof assembly according to claim 17, wherein said open end of said protective cover that extends around said cable having a chamfer.

19. A waterproof assembly according to claim 18, wherein said protective cover is formed of rubber.

20. A waterproof assembly according to claim 19, wherein an outer surface of said protective cover has an anti-slide layer.

21. A waterproof assembly according to claim 8, wherein each of said at least one waterproof gasket is an inner groove formed in the receiving cavity.

22. A waterproof assembly according to claim 15, wherein each of said at least one waterproof gasket is an inner groove formed in the receiving cavity.

* * * * *

UNITED STATES PATENT AND TRADEMARK OFFICE
CERTIFICATE OF CORRECTION

PATENT NO. : 9,531,180 B2
APPLICATION NO. : 14/167400
DATED : December 27, 2016
INVENTOR(S) : Yiming Xu et al.

Page 1 of 1

It is certified that error appears in the above-identified patent and that said Letters Patent is hereby corrected as shown below:

In the Claims

In Column 4, Line 38, delete "cable" and insert --connector-- in its place.

Signed and Sealed this
Twelfth Day of June, 2018

Andrei Iancu
*Director of the United States Patent and Trademark Office*